(12) United States Patent
Yuan et al.

(10) Patent No.: US 12,027,850 B2
(45) Date of Patent: Jul. 2, 2024

(54) DIRECT CURRENT LOAD RESPONSE CONTROL METHOD AND DEVICE, AND A DIRECT CURRENT ELECTRIC APPLIANCE

(71) Applicant: GREE ELECTRIC APPLIANCES, INC. OF ZHUHAI, Zhuhai (CN)

(72) Inventors: Jinrong Yuan, Zhuhai (CN); Zhigang Zhao, Zhuhai (CN); Weijin Li, Zhuhai (CN); Qiulian Li, Zhuhai (CN); Jiangxi Song, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 352 days.

(21) Appl. No.: 17/625,001

(22) PCT Filed: Jul. 7, 2020

(86) PCT No.: PCT/CN2020/100556
§ 371 (c)(1),
(2) Date: Jan. 5, 2022

(87) PCT Pub. No.: WO2021/031721
PCT Pub. Date: Feb. 25, 2021

(65) Prior Publication Data
US 2022/0320859 A1   Oct. 6, 2022

(30) Foreign Application Priority Data
Aug. 16, 2019   (CN) .......................... 201910759991.4

(51) Int. Cl.
*H02J 1/14* (2006.01)
*G05B 19/042* (2006.01)

(52) U.S. Cl.
CPC .............. *H02J 1/14* (2013.01); *G05B 19/042* (2013.01); *G05B 2219/2639* (2013.01)

(58) Field of Classification Search
CPC ...... H02J 1/14; H02J 2310/52; H02J 2310/58; G05B 19/042; G05B 2219/2639
See application file for complete search history.

(56) References Cited

U.S. PATENT DOCUMENTS

| | | | |
|---|---|---|---|
| 2009/0102425 A1 | 4/2009 | Takahashi | |
| 2009/0193276 A1* | 7/2009 | Shetty | H02J 1/14 713/340 |

(Continued)

FOREIGN PATENT DOCUMENTS

| | | |
|---|---|---|
| CN | 102938587 A | 2/2013 |
| CN | 104993490 A | 10/2015 |

(Continued)

OTHER PUBLICATIONS

Extended European Search Report mailed Jun. 8, 2022, issued in corresponding European Application No. EP 20 85 5176, filed Jul. 7, 2020, 8 pages.

(Continued)

*Primary Examiner* — Shon G Foley
(74) *Attorney, Agent, or Firm* — Christensen O'Connor Johnson Kindness PLLC (57) ABSTRACT

The present disclosure relates to the technical field of smart home, and provides a direct current load response control method and device, and a direct current electric appliance. The direct current load response control method of the present disclosure comprises: monitoring a utilization voltage of a direct current load; determining whether the utilization voltage is within a response interval; and controlling the operation of the direct current load according to the determination result and the type of the direct current load.

15 Claims, 6 Drawing Sheets

(56) References Cited

U.S. PATENT DOCUMENTS

2016/0181815 A1    6/2016  Black et al.
2021/0391720 A1   12/2021  Zhao et al.

FOREIGN PATENT DOCUMENTS

| CN | 109004671 A | 12/2018 |
|---|---|---|
| CN | 109473964 A | 3/2019 |
| CN | 110429712 A | 11/2019 |
| DE | 102012202009 A1 | 8/2013 |
| EP | 0 978 920 A1 | 2/2000 |
| GB | 2 139 829 A | 11/1984 |
| JP | H10341532 A | 12/1998 |
| WO | 2013/117524 A2 | 8/2013 |

OTHER PUBLICATIONS

International Search Report mailed Oct. 13, 2020, issued in corresponding International Application No. PCT/CN2020/100556, filed Jul. 7, 2020, 2 pages.

Written Opinion mailed Nov. 25, 202, issued in corresponding Singapore Application No. 11202113636P, filed Jul. 7, 2020, 8 pages.

* cited by examiner

DIRECT CURRENT LOAD RESPONSE CONTROL METHOD AND DEVICE, AND A DIRECT CURRENT ELECTRIC APPLIANCE

CROSS REFERENCE TO RELATED APPLICATION

This application is a National Stage of International Application No. PCT/CN2020/100556, filed Jul. 7, 2020, which is based on and claims priority to Chinese Patent Application with No. 201910759991.4 and filed on Aug. 16, 2019, the content of which is expressly incorporated herein by reference in its entirety.

TECHNICAL FIELD

The present disclosure relates to the field of smart home technology, and particularly to a direct current load response control method and apparatus, and a direct current electric appliance.

BACKGROUND

With the rapid development of technology, the demand for intelligence has become more and more common. Under the energy system architecture of the Direct Current (DC) microgrid, the smart DC home has also entered people's view.

In the energy Internet or DC microgrid system, it is necessary to implement the communication response between the power supply side and the DC load side of the DC microgrid. When the voltage on the power supply side changes, the operation state of the load on the power utilization side may passively respond accordingly. For example, when the power supply is insufficient, the operation is stopped or the power is reduced when operating, and the power is increased when the power supply is restored.

SUMMARY

According to one aspect of the present disclosure, a direct current (DC) load response control method is provided, including: monitoring a utilization voltage of the DC load; determining whether the utilization voltage is in a response range; and controlling an operation of the DC load according to a determination result and a type of the DC load.

In some embodiments, the DC load response control method further includes: categorizing DC loads in a network according to a startup operation characteristic of each DC load in the network before monitoring the utilization voltage of the DC load.

In some embodiments, the type of the DC load includes an adjustable power load, a transferable power load, or a fixed power load.

In some embodiments, the response range is one of a plurality of operation ranges divided according to a proportional value of a rated voltage on a power supply side or a voltage difference with the rated voltage; and a load control solution corresponding to the response range including controlling the DC load whether to operate or adjusting an operating parameter of the DC load according to a voltage change parameter, wherein each operation range corresponds to one load control solution.

In some embodiments, the plurality of operation ranges further includes a protection range, an isolation range, and a normal operation range; and a load control solution corresponding to the protection range includes shutdown protection; a load control solution corresponding to the isolation range includes controlling the load to operate normally and controlling the load to prepare for a response; a load control solution corresponding to the normal operation range includes controlling the load to operate normally without responding.

In some embodiments, when the DC load is an adjustable power load, the controlling the operation of the DC load includes: adjusting a power of the DC load according to the utilization voltage.

In some embodiments, the controlling the operation of the DC load according to the determination result and the type of the DC load includes: when the DC load is an adjustable power load, if the determination result indicates that the utilization voltage is in the response range, controlling an operating parameter of the DC load to decrease or increase according to a preset corresponding relationship between a voltage and the operating parameter; and if the determination result indicates that the utilization voltage is not in the response range and not in the protection range, controlling the DC load to operate normally without responding.

In some embodiments, when the DC load is a transferable power load, the controlling the operation of the DC load includes: controlling the DC load to operate when a duration of voltage stabilization exceeds a predetermined time length.

In some embodiments, the controlling the operation of the DC load according to the determination result and the type of the DC load includes: when the DC load is a transferable power load, if the determination result indicates that the utilization voltage is in the response range, controlling the DC load to enter an operation waiting state and determining whether a waiting time is greater than a first set time, and if the waiting time is greater than the first set time, controlling the DC load to enter an operation state; and if the determination result indicates that the utilization voltage is not in the response range and not in the protection range, controlling the DC load to operate normally, or determining whether a duration in which the utilization voltage is in the normal operation range is greater than a second set time, if the duration is greater than the second set time, controlling the DC load to start the normal operation, and if the duration is not greater than the second set time, controlling the DC load to enter the operation waiting state.

In some embodiments, when the DC load is a fixed power load, the controlling the operation of the DC load includes: controlling the DC load to intermittently operate or stop operating.

In some embodiments, the controlling the operation of the DC load according to the determination result and the type of the DC load includes: when the DC load is a fixed power load, if the determination result indicates that the utilization voltage is in the response range, determining whether an utilization power of the DC load is greater than a set power; if the utilization power is greater than the set power, controlling the DC load to stop operating; and if the utilization power is not greater than the set power, controlling the DC load to operate normally, or controlling the DC load to stop operating or operate intermittently according to a set importance level of the DC load; and if the determination result indicates that the utilization voltage is not in the response range and not in the protection range, controlling the DC load to operate normally.

In some embodiments, the monitoring the utilization voltage of the DC load includes: monitoring the utilization voltage of the DC load by using a sampling circuit in the DC load.

According to another aspect of the present disclosure, a (DC load response control apparatus is provided, including: a monitoring module, configured to monitor a utilization voltage of the DC load; a determination module, configured to determine whether the utilization voltage is in a response range; and a control module, configured to control an operation of the DC load according to a determination result and a type of the DC load.

According to another aspect of the present disclosure, a DC load response control apparatus is provided, including: a memory; and a processor coupled to the memory, the processor is configured to execute the DC load response control method in the above embodiments based on instructions stored in the memory.

According to another aspect of the present disclosure, a DC electric appliance is provided, including the DC load response control apparatus based on the voltage change in the above embodiment.

According to another aspect of the present disclosure, a computer-readable storage medium is provided, on which a computer program is stored, the program, when executed by a processor, implements the DC load response control method in the above embodiments.

BRIEF DESCRIPTION OF THE DRAWINGS

The accompanying drawings described herein are used for providing a further understanding of the present disclosure and constitute a part of the present disclosure. The exemplary embodiments of the present disclosure and the description thereof are used for explaining the present disclosure rather than constituting any improper limitation on the present disclosure. In the drawings.

DETAILED DESCRIPTION

In order to make the purpose, the technical solution and the advantages of the present disclosure clearer, the present disclosure will be described in detail with reference to the accompanying drawings. Obviously, the embodiments described here are merely a part of the embodiments of the present disclosure, rather than all the embodiments. Based on the embodiments of the present disclosure, all other embodiments obtained by a person of ordinary skill in the art without creative work shall fall within the protection scope of the present disclosure.

It should be noted that the terms "first" and "second" in the specification, claims and drawings of the present disclosure are utilized to distinguish similar objects, and not definitely utilized used to describe a specific sequence or sequence. It should be appreciated that the data used in this way can be interchanged under appropriate circumstances so that the embodiments of the present disclosure described herein can be implemented in a sequence other than those illustrated or described herein. In addition, the terms "including" and "having" and any variations of them are intended to cover non-exclusive inclusions. For example, a process, method, system, product, or device that includes a series of steps or units is not definitely limited to those clearly listed. Those steps or units may include other steps or units that are not clearly listed or are inherent to the process, method, product, or device.

It should be noted that the steps shown in the flow chart of the accompanying drawings can be executed in a computer system such as a set of computer-executable instructions, and although the logical sequence is shown in the flow chart, in some cases, the steps shown or described can be performed in a different order than here.

In the related art, when facing voltage changes on the power supply side, all loads on the power utilization side (electrical appliances that use the direct current) passively adopt a unified response mode. Such mode often leads to a high frequency of DC voltage change. For example, under a certain DC voltage lower than the normal voltage, the power of all DC appliances suddenly decreases; and when the voltage is restored to the normal voltage, the power of all DC appliances suddenly increases. The unified response mode may also cause some DC appliances to fail to operate normally. For example, a DC washing machine is washing clothes. If the power is reduced, the washing machine may not operate normally. If the corresponding DC appliances are designed in order to cooperate with the unified response mode, the design and implementation process are more complicated.

In view of the problem that the response mode of the DC electrical appliances in the DC microgrid leads to the high frequency of DC voltage change and not applicable to some DC electrical appliances, the present disclosure provides a DC load response control method, device and DC electrical appliances based on the voltage change to solve the problem that the response mode of the DC electrical appliances in the DC microgrid leads to the high frequency of DC voltage change and not applicable to some DC electrical appliances.

Optional embodiments of the present disclosure will be described in detail below with reference to the accompanying drawings.

Figure 1:
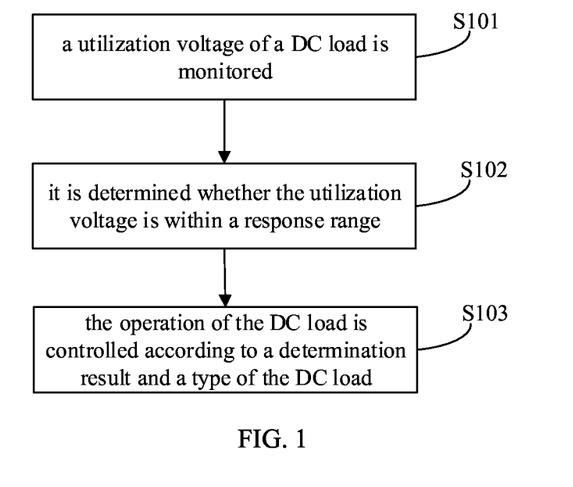
FIG. 1 is a flow chart showing a DC load response control method based on a voltage change according to some embodiments of the present disclosure.

A flow chart of a DC load response control method based on a voltage change according to some embodiments of the present disclosure is shown in FIG. 1. The DC load response control method includes the following steps.

At S101, a utilization voltage of a DC load is monitored.

The DC load refers to a load on the power utilization side in the DC microgrid, that is, a DC appliance. The utilization voltage of the DC load refers to a voltage at a power supply end of the DC load, that is, a DC bus voltage. In some embodiments, a sampling circuit in the DC load is utilized to monitor the utilization voltage of the DC load. In some embodiments, in addition to monitoring the utilization voltage, the sampling circuit in the DC load is also utilized to monitor an utilization power of the DC load simultaneously. For example, when the operating parameters of the DC load are adjusted, the monitored utilization power is used as a reference for the adjustment.

At S102, it is determined whether the utilization voltage is within a response range.

A proportional value of a rated voltage on the power supply side or a voltage difference with the rated voltage is partitioned into multiple operation ranges, and each operation range corresponds to a load control solution. The response range is one of the multiple operation ranges; and the load control solution corresponding to the response range is to control the DC load to operate or not to operate according to a voltage change parameter, or to adjust the operating parameter of the DC load according to the voltage change parameter. The voltage change parameter includes a voltage change ratio or a voltage change difference. In some embodiments, the operating parameter includes one or more of a power, a gear, a wind speed, or a temperature, and is related to the function of the DC electric appliance.

In some embodiments, the partitioned operation ranges include: a response range, a normal operation range, and a protection range. The load control solution corresponding to the protection range is to control the protection operation of the load, for example, shutdown protection. The load control solution corresponding to the normal operation range is to control the load to operate normally without a response. In addition, in some embodiments, in order to prevent the voltage from jumping back and forth between the normal operation range and the response range, an isolation range is set; and the load control solution corresponding to the isolation range is to control the load to operate normally while controlling the load to enter a response preparation.

In some embodiments, the protection range includes a high-voltage protection range and a low-voltage protection range. A proportional value of the rated voltage of the high-voltage protection range is greater than or equal to a first proportional value of the rated voltage; and a proportional value of the rated voltage of the low-voltage protection range is less than or equal to a second proportional value of the rated voltage; a proportional value of the rated voltage of the response range is greater than the second proportional value of the rated voltage and less than or equal to a third proportional value of the rated voltage; a proportional value of the rated voltage of the normal operation range is less than the first proportional value of the rated voltage and greater than or equal to a fourth proportional value of the rated voltage; a proportional value of the rated voltage of the isolation range is less than the fourth proportional value of the rated voltage and greater than the third proportional value of the rated voltage. The first proportional value is greater than the fourth proportional value; the fourth proportional value is greater than the third proportional value; and the third proportional value is greater than the second proportional value. The load control solution corresponding to the high-voltage protection range is to control the load under the high-voltage protection; the load control solution corresponding to the low-voltage protection range is to control the load under the low-voltage protection. Therefore, a maximum voltage of the low-voltage protection range is lower than a minimum voltage of the response range; a maximum voltage of the response range is lower than a minimum voltage of the isolation range; a maximum voltage of the isolation range is lower than a minimum voltage of the normal operation range; a maximum voltage of the normal operation range is lower than a minimum voltage of the high-voltage protection range.

In some embodiments, for the DC microgrid power supply side, an allowable operation range is set within ±10% of the rated voltage as required, or the user can set the allowable operation range according to the requirements of the DC load side. The DC microgrid 400 VDC of power supply is used as the rated voltage; and the voltage value at the power supply side is partitioned into the low-voltage protection range, the response range, the isolation range, the normal operation range, the high-voltage protection range, etc. when the voltage drops or falls below −10% of the rated voltage, that is, less than or equal to 360 VDC, the voltage is in the low-voltage protection range. When the voltage falls within a range of −10% to −6% of the rated voltage, that is, a range of 360V to 376 VDC, the voltage is in the response range. When the voltage falls into a range of −6% to −5% of the rated voltage, that is, a range of 376V to 380 VDC, the voltage is in the isolation range. When the voltage is in a range of −5% to 10% of the rated voltage, that is, a range of 380V to 440 VDC, the voltage is in the normal operation range. When the voltage changes suddenly or is higher than 10% of the rated voltage, i.e., greater than or equal to 440 VDC, the voltage is in the high-voltage protection range.

At S103, the operation of the DC load is controlled according to a determination result and a type of the DC load.

In some embodiments, all DC loads in the DC microgrid are summarized as at least three types. For example, the DC air conditioner is an adjustable power load; the DC washing machine, the DC electric water heater, etc., are transferable power loads; the DC lamp, the DC television, the DC hair dryer, the DC iron, the DC electric kettle, etc., are fixed power loads. In some embodiments, before the step of monitoring the utilization voltage of the DC load, the method further includes: the DC loads in the network are categorized according to startup operation characteristics of the DC loads in the network.

According to different types of DC loads in the DC microgrid, the present disclosure formulates corresponding smart response solutions capable of responding to changes in DC bus voltage, in which the relative stability of the power during the response in increased, thereby reducing the change frequency of the DC voltage fluctuations, and making more an orderly and stable response to the voltage change at the power supply side to achieve an orderly power utilization.

The step S103 of controlling the operation of the DC load according to the determination result and the type of the DC load will be detailed as follows. It should be noted that, in the embodiments of the present disclosure, the following situations are merely used as examples for illustration, and do not constitute a limitation. Those skilled in the art can summarize the DC loads as more types according to the concept of the present disclosure, which also belong to the protection scope of the present disclosure.

(1) Adjustable Power Load

In some embodiments, when the type of the DC load is an adjustable power load, the load is controlled by adjusting the power of the DC load according to the utilization voltage. In some embodiments, if the determination result is that the utilization voltage is in the response range, the operating parameter of the DC load is controlled to decrease or increase according to a corresponding relationship between a preset voltage and the operating parameter; if the determination result is that the utilization voltage is not in the response change and not in the protection range, that is, the utilization voltage is in the isolation range or the normal operation range, the DC load is controlled to operate normally without responding. If the utilization voltage is in the protection range, the DC load is controlled to operate under the low-voltage protection or high-voltage protection.

In some embodiments, for the type of adjustable power load, the utilization power of the DC load is monitored to serve as a reference for subsequent adjustment of the power.

The corresponding relationship between the voltage and the operating parameter is set and stored in advance, such as a corresponding relationship between a voltage value and an operating parameter value, or a corresponding relationship between a voltage change and an operating parameter change, for example, a voltage of 400V corresponds to a power of 8000 W, a voltage of 300V corresponds to a power of 6000 W. For another example, every 10V drop in the voltage corresponds to a power drop of 200 W.

Figure 2:
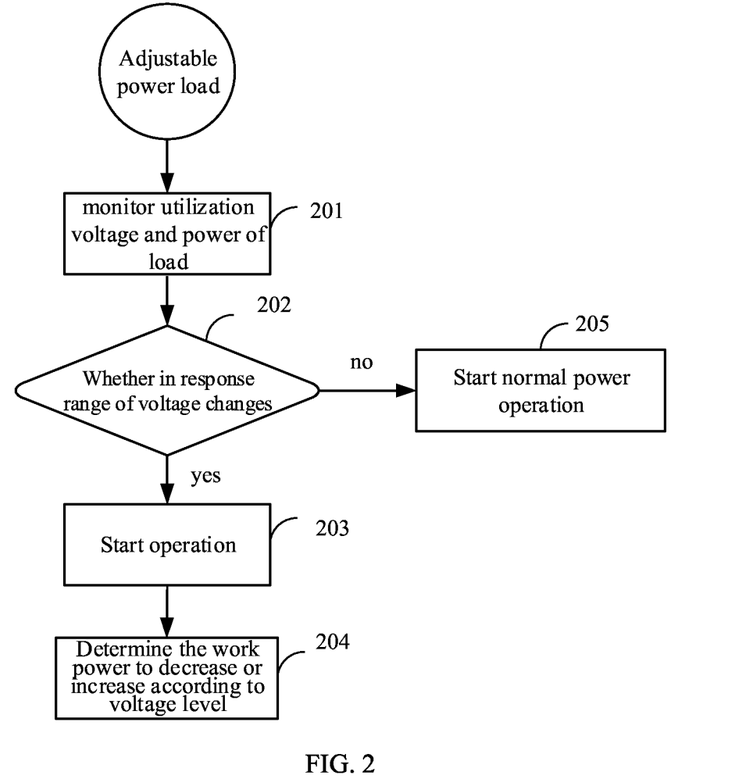
FIG. 2 is a flow chart showing an adjustable power load response method according to some embodiments of the present disclosure.

Referring to FIG. 2, a DC air conditioner is taken as an example.

At step 201, a utilization voltage and an utilization power of the DC air conditioner are monitored.

At step 202, it is determined whether the utilization voltage is in the response range; when the utilization voltage is in the normal operation range, a step 205 is performed; when the utilization voltage is in the response range, a step 203 is performed.

At step 203, the air conditioner is in operation, and a step 204 is performed. In addition, when the utilization voltage is in the protection range, the DC air conditioner stops for protection. When the utilization voltage is in the isolation range, the DC air conditioner is controlled to operate normally and a response is prepared for. When the utilization voltage is in the response range, the air conditioner starts to operate.

At step 204, according to the set voltage change ranges, a work power of the DC air conditioner is reduced or increased. In some embodiments, work of a compressor is directly restricted to provide a quick respond; or the DC air conditioner sets a target temperature in the background according to the communication requirements (i.e., the rise and fall of the DC bus voltage) instead of using the target temperature set by the user. For example, in a refrigeration mode, if it is desired to reduce the work power, the temperature difference needs to be reduced, so the target temperature can be automatically increased.

At step 205, the DC air conditioner operates normally, and performs cooling or heating normally according to the target temperature set by the user.

Through such method, for the adjustable power load, when the utilization voltage is in the response range, the operating parameter of the DC load is dynamically adjusted according to the voltage change, accordingly a more orderly and stable response is made to the voltage change on the power supply side, thereby implementing the intelligent response of the DC home.

(2) Transferable Power Load

In some embodiments, when the type of the DC load is a transferable power load, the load is controlled by controlling the operation of the DC load when a duration of voltage stabilization exceeds a predetermined time length. In some embodiments, if the determination result is that the utilization voltage is in the response range, the DC load is controlled to enter an operation waiting state (for example, standby or pause), and it is determined whether the waiting time exceeds first set time; if the waiting time exceeds the first set time, the DC load is controlled to enter the operation state; and if the waiting time does not exceed the first set time, the process returns to continue to determine whether the monitored utilization voltage is in the response range. If the determination result is that the utilization voltage is not in the response range and not in the protection range, that is, the utilization voltage is in the isolation range or the normal operation range, then the DC load is controlled to operate normally (that is, transferable power load does not response when operating until the work is completed); or, it is determined whether a duration in which the utilization voltage is in the normal operation range is greater than a second set time; if the duration is greater than the second set time, the DC load is controlled to start the normal operation; if the duration is not greater than the second set time, the DC load is controlled to enter the operation waiting state. If the utilization voltage is in the protection range, the DC load is controlled to operate under the low-voltage protection or high-voltage protection.

The first set time is user demand time, that is, waiting time acceptable to the user. The first set time is set according to at least one of the user's own needs or the actual use of the electrical appliance. In some embodiments, the time is set with reference to a duration in which an item is deteriorated due to non-operation of the DC electric appliance for a long time. For example, if clothes are not washed in the washing machine for a long time, the clothes may cause rancidity. The second set time is device demand time, that is, the time required for the device to complete one operation, for example, the time for the washing machine to finish washing clothes. In some embodiments, the second set time is predicted according to a current power consumption situation of the DC microgrid to determine whether the voltage can support the DC electrical appliance to finish a complete operation with sufficient time. In some embodiments, types of the loads are different, and the first set time and the second set time are different accordingly.

Figure 3:
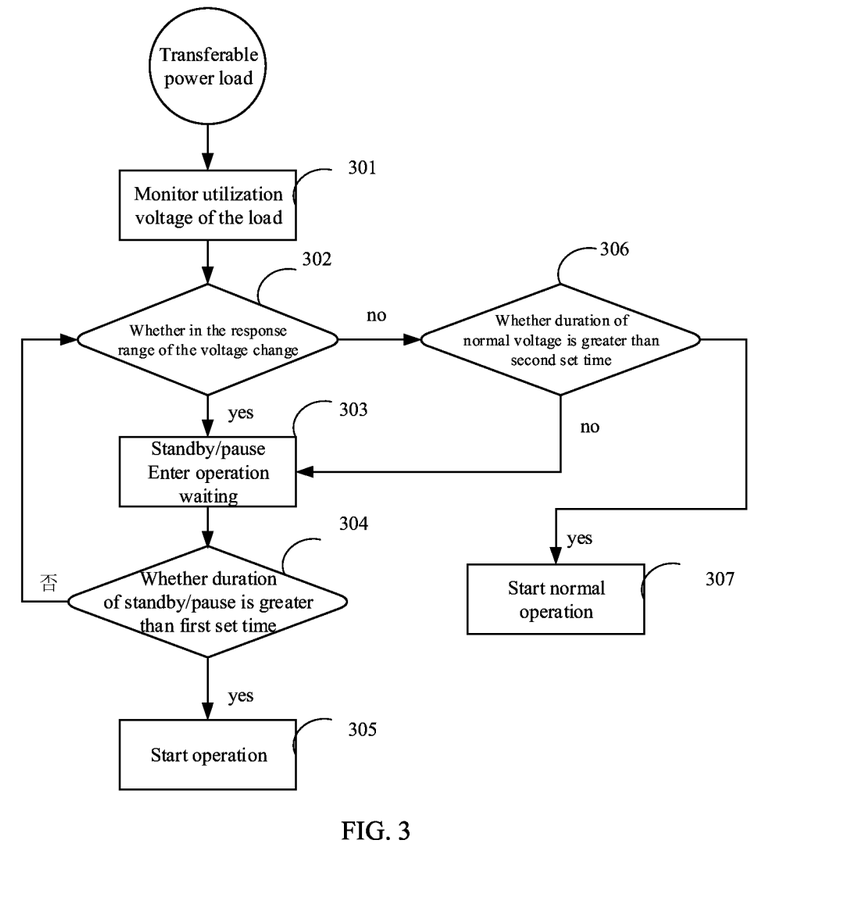
FIG. 3 is a flow chart showing a transferable power load response method according to some embodiments of the present disclosure.

Referring to FIG. 3 for the transferable power load.

At step 301, the utilization voltage of the DC load is monitored.

At step 302, it is determined whether the DC bus voltage is in the response range. If the DC bus voltage is in the response range, a step 303 is executed. If the DC bus voltage is in the normal operation range, in some embodiments, the DC load operates directly; and in other embodiments, a step 306 is performed.

At step 303, the DC load enters an operation waiting state and a step 304 is performed, instead of performing work according to the target instruction of the user.

At step 304, it is determined whether the waiting time is greater than the first set time, and if the waiting time is greater than the first set time, the step 305 is performed. If the utilization voltage enters the protection range when the waiting time is not greater than the first set time, then the process returns to the step 302.

At step 305, the DC load enters the operation state to avoid user loss due to excessive responses.

At step 306, it is determined whether the duration in which the voltage in the normal operation range is greater than the second set time; and if the duration in which the voltage in the normal operation range is greater than the second set time, a step 307 is performed.

At step 307, the operation is started.

In such a manner, the DC load starts operation when the duration of the voltage stabilization reaches the preset time, to ensure that the duration in which the voltage of the DC appliance is in the normal operation range can support the DC appliance to finish a complete operation (for example, doing laundry once), and avoid user loss and affecting user experience caused by a midway response.

Through such manner, for the transferable power load, when the utilization voltage is in the response range, the corresponding response is provided according to the user demand time, so that the DC appliance responds more orderly and stably to the voltage change on the power supply side, thereby implementing the orderly electricity utilization and intelligent response of the DC home.

(3) Fixed Power Load

In some embodiments, when the type of DC load is a fixed power load, the load is controlled by controlling the DC load to operate intermittently or stop operating. In some embodiments, if the determination result is that the utilization voltage is in the response range, it is determined whether the utilization power of the DC load is greater than the set power; if the utilization power is greater than the set power, the DC load is controlled to stop operating; if the utilization power is not greater than the set power, the DC load is controlled to operate normally; or the DC load is controlled to stop operating or operate intermittently according to a set importance level of the DC load. If the determination result is that the utilization voltage is not in the response range and not in the protection range (that is, the utilization voltage is in the isolation range or the normal operation range), then the DC load is controlled to operate normally. If the utilization voltage is in the protection range, the DC load is controlled to operate under the low-voltage protection or high-voltage protection.

In some embodiments, the set power is a power value set by the user to distinguish a high-power electrical appliance from a low-power electrical appliance, for example, 250 W. In some embodiments, the importance level of the DC load is set by the user according to his actual usage. The DC appliances with utilization power not greater than the set power have little response when voltage changes at the power supply-load sides, or the demand for power reduction on the power utilization side cannot be satisfied. Therefore, when the utilization voltage of the fixed power load is in the response range, the DC appliances, of which the utilization power is not greater than the set power, continue to operate, which does not have any impact on the power utilization of the system.

In some embodiments, the load is controlled to operate according to the importance level of the load. If the importance level of the fixed power load is higher than or equal to a preset level (that is, the fixed power load is more important in the DC microgrid), the fixed power load is controlled to operate normally; if the importance level of the fixed power load is lower than the preset level, the fixed power load is controlled to stop operating. For example, if a lamp is an ordinary lamp, the lamp is controlled to turn off; if the lamp is an emergency lamp with a high importance level, the lamp is controlled to operate normally. In some embodiments, for the fixed power load with the important level lower than the preset level, the fixed power load is controlled to operate intermittently, that is, to operate normally for a period of time and stop operating for a period of time. The specific period of time for stopping the operation or normal operation is set according to the actual use demands of the DC load.

In some embodiments, before determining whether the utilization power of the DC load is greater than the set power, an electricity current or the utilization power of the DC load is also monitored. In order to compare the utilization power with the set power of the DC load, the present disclosure provides two manners to obtain the user power. One is to monitor the electricity current of the DC load and calculate the utilization power in combination with the utilization voltage of the electricity current; the other is to directly monitor the utilization power of the DC load.

Figure 4:
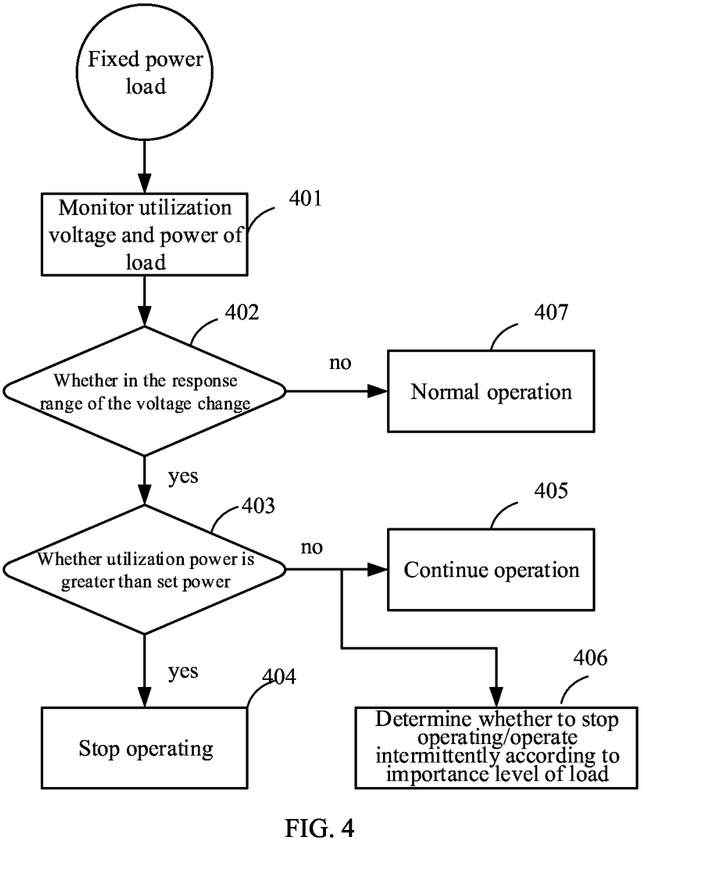
FIG. 4 is a flow chart showing a fixed power load response method according to some embodiments of the present disclosure.

As shown in FIG. 4:

At step 401, the utilization voltage and utilization power of the DC load are monitored.

At step 402, it is determined whether the utilization voltage is in the response range, and if the utilization voltage is in the response range, the step 403 is performed. If the utilization voltage is not in the response range and not in the protection range (that is, the utilization voltage is in the isolation range or the normal operation range), the step 407 is performed.

At step 403, it is determined whether the utilization power is greater than the set power; if the utilization power is greater than the set power, the step 404 is performed; if the utilization power is not greater than the set power, the step 405 or 406 is performed.

At step 404, the operation is stopped and no power is taken from the power supply side.

At step 405, the DC load operates normally.

At step 406, the DC load stops operating or operates intermittently according to the importance level of the DC load set by the user.

At step 407, the DC load is controlled to operate normally.

In this embodiment specific to the fixed power load, when the utilization voltage is in the response range, a specific response is determined according to the utilization power of the fixed power load, and a more orderly and stable response is made to the voltage change on the power supply side, thereby implementing the intelligent response of the DC home.

It should be noted that a subdivision is performed in the above different types of loads, and the subdivision type of loads in the same type can work together.

Based on the same inventive concept, the present disclosure provides a DC load response control apparatus based on a voltage change, which is applied to implement the DC load response control method based on the voltage change mentioned in the above embodiments.

Figure 5:
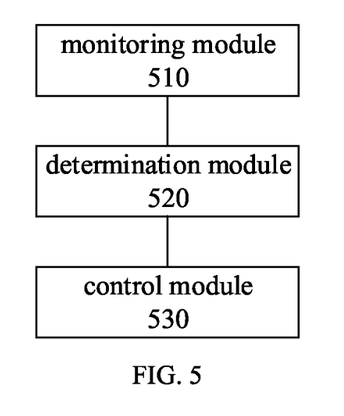
FIG. 5 is a schematic diagram illustrating a DC load response control apparatus based on a voltage change according to some embodiments of the present disclosure.

In some embodiments of the present disclosure, a DC load response control apparatus based on a voltage change is provided, and a schematic structure diagram of the apparatus is shown in FIG. 5. The DC load response control apparatus includes:
  a monitoring module 510, capable of monitoring a utilization voltage of the DC load;
  a determination module 520, capable of determining whether the utilization voltage is in a response range;
  a control module 530, capable of controlling the operation of the DC load according to a determination result and a type of the DC load.

In some embodiments, the above-mentioned apparatus further includes: a categorization module, which categorizes the DC loads in the network according to a startup operation characteristic of each DC load in the network before monitoring the utilization voltages of the DC loads.

In some embodiments, the response range is an operation range of a plurality of operation ranges divided according to a different ratio value of the rated voltage on the power supply side or a different voltage difference from the rated voltage, and each operation range corresponds to a load control solution. The load control solution corresponding to the response range is that the DC load is controlled to operate or an operating parameter of the DC load is adjusted according to the voltage change parameters. In some embodiments, the specific range division is the same as or similar to that mentioned in the above embodiments.

In some embodiments, when the DC load is an adjustable power load, and if the determination result indicates that the utilization voltage is in the response range, the control module 530 controls the operating parameter of the DC load to decrease or increase according to the preset corresponding relationship between the voltage and the operating parameter. If the determination result indicates that the utilization voltage is not in the response range and not in the protection range, the DC load is controlled to operate normally without a response.

In some embodiments, when the DC load is a transferable power load and if the determination result indicates that the utilization voltage is in the response range, the control module 530 controls the DC load to enter the operation waiting state and determine whether the waiting time is greater than the first set time; if the waiting time is greater than the first set time, the control module 530 controls the DC load to enter the operation state. If the determination result indicates that the utilization voltage is not in the response range and not in the protection range, the control module 530 controls the DC load to operate normally, or determines whether the duration in which the utilization voltage is in the normal operation range is greater than the second set time, if the duration is greater than the second set time, the control module 530 controls the DC load to start the normal operation; and if the duration is not greater than the second set time, the control module 530 controls the DC load to enter the operation waiting state.

In some embodiments, when the DC load is a fixed power load and if the determination result indicates that the utilization voltage is in the response range, the control module 530 determines whether the utilization power of the DC load is greater than the set power; if the utilization power is greater than the set power, the control module 530 controls the DC load to stop operating; if the utilization power is not greater than the set power, the control module 530 controls the DC load to operate normally, or the control module 530 controls the DC load to stop operating or operate intermittently according to the set importance level of the DC load. If the determination result indicates that the utilization voltage is not in the response range and not in the protection range, the control module 530 controls the DC load to operate normally.

In some embodiments, the monitoring module 510 uses a sampling circuit in the DC load to monitor the utilization voltage of the DC load.

The above-mentioned apparatus can execute the method provided by the embodiment of the present disclosure, and has corresponding functional modules for executing the method and beneficial effects. For technical details that are not described in detail in this embodiment, reference can be made to the method provided in the embodiment of the present disclosure.

Figure 6:
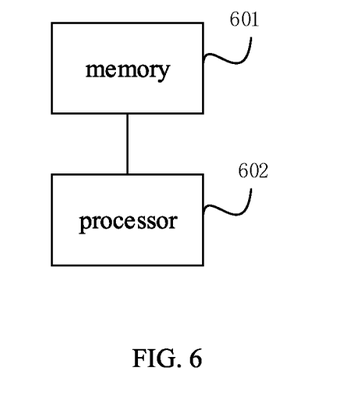
FIG. 6 is a schematic diagram illustrating a DC load response control apparatus according to other embodiments of the present disclosure.

A schematic structure diagram of a DC load response control apparatus according to some embodiments of the present disclosure is shown in FIG. 6. The DC load response control apparatus includes a memory 601 and a processor 602. The memory 601 is a magnetic disk, flash memory or any other non-transitory storage medium. The memory is configured to store instructions in the corresponding embodiment of the above DC load response control method. The processor 602 is coupled to the memory 601 and is implemented as one or more integrated circuits, such as a microprocessor or a microcontroller. The processor 602 is configured to execute instructions stored in the memory, and can make a more orderly and stable response to changes in the voltage on the power supply side, and implement the orderly power utilization.

Figure 7:
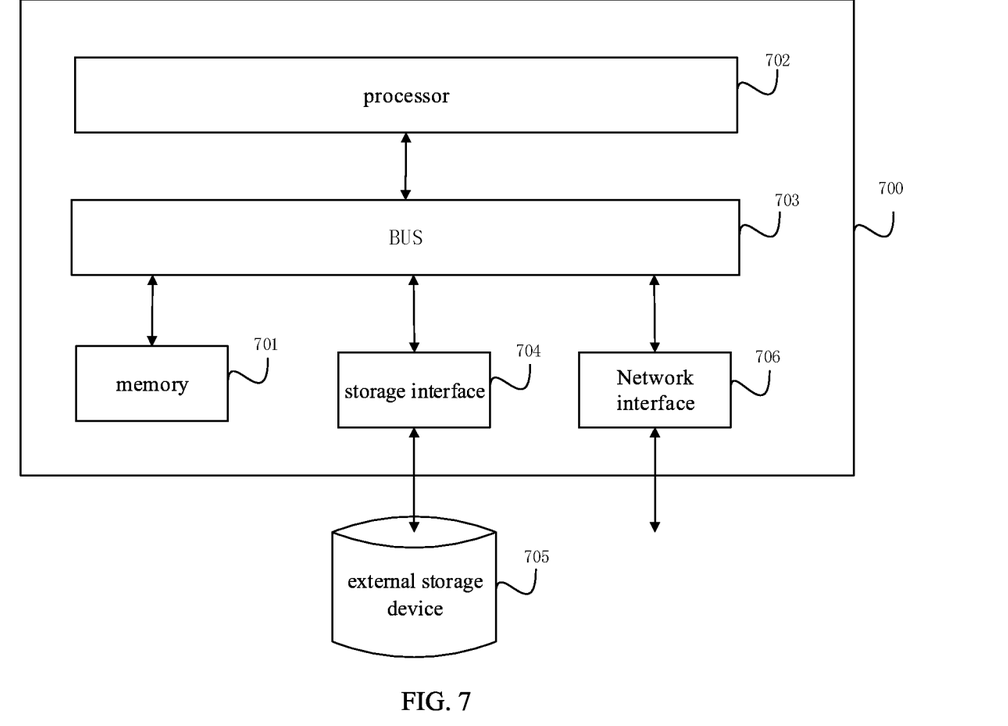
FIG. 7 is a schematic diagram illustrating a DC load response control apparatus according to other embodiments of the present disclosure.

In some embodiments, as shown in FIG. 7, the DC load response control apparatus 700 includes a memory 701 and a processor 702. The processor 702 is coupled to the memory 701 through a bus 703. The DC load response control apparatus 700 is also connected to an external storage device 705 through a storage interface 704 to call external data, and is also connected to a network or another computer system (not shown) through a network interface 706. Details are not introduced here.

In this embodiment, the data instructions are stored in the memory, and the above instructions are processed by the processor, which can make a more orderly and stable response to the changes in the voltage on the power supply side, thereby implementing the orderly power utilization.

The present disclosure also provides a DC electric appliance, which includes the above-mentioned DC load response control apparatus based on the voltage change. The utilization voltage/utilization power monitoring circuit is set for the DC electric appliance, and an internal control circuit is cooperated with to complete the load response capability of the electricity side based on the voltage change.

The present disclosure also provides a computer-readable storage medium on which a computer program is stored, and when the program is executed by a processor, the above-mentioned DC load response control method based on the voltage change is implemented.

The device embodiments described above are merely illustrative, where the units described as separate components are or are not physically separated, and the components displayed as units are or are not physical units, that is, they are located in one place or distributed to multiple network units. Some or all of the modules are selected according to actual requirements to achieve the purpose of the solution of the embodiment.

Through the description of the above implementation manners, those skilled in the art can clearly understand that each implementation manner can be implemented by means of software plus a necessary general hardware platform, and of course it can also be implemented by hardware. Based on this understanding, the above technical solution essentially or the part that contributes to the existing technology can be embodied in the form of a software product, and the computer software product can be stored in a computer-readable storage medium, such as ROM/RAM, magnetic disks, optical disks, etc., including several instructions to make a computer device (such as a personal computer, a server, or a network device, etc.) execute the method described in each embodiment or some parts of the embodiment.

Finally, it should be noted that the above embodiments are merely utilized to illustrate the technical solution of the present disclosure, not to limit the disclosure. Although the present disclosure has been described in detail with reference to the foregoing embodiments, those of ordinary skill in the art should understand that they can still modify the technical solution, or equivalently replace some of the technical features recorded in the foregoing embodiments; and these modifications or replacements do not cause the essence of the corresponding technical solution to deviate from the spirit and scope of the technical solution of the embodiments of the present disclosure.

What is claimed is:

1. A direct current (DC) load response control method, comprising:
monitoring a utilization voltage of the DC load;
determining whether the utilization voltage is in a response range; and controlling an operation of the DC load according to a determination result and a type of the DC load;
wherein the controlling the operation of the DC load according to the determination result and the type of the DC load comprises, in response to determining that the type of the DC load includes a fixed power load:
controlling the fixed power load to stop operating in response to the determination result indicating that the utilization voltage is in the response range and the utilization power being greater than a predetermined power,
controlling the fixed power load to stop operating or operate intermittently according to a predetermined importance level of the fixed power load, or to operate normally, in response to the determination result indicating that the utilization voltage is in the response range and the utilization power being not greater than the predetermined power; and
controlling the fixed power load to operate normally in response to the determination result indicating that the utilization voltage is not in the response range and not in the protection range.

2. The method according to claim 1, further comprising:
categorizing the DC loads in a network according to a startup operation characteristic of each DC load in the network before monitoring the utilization voltage of the DC load.

3. The method according to claim 1, wherein the type of the DC load comprises an adjustable power load, a transferable power load, or a fixed power load.

4. The method according to claim 1, wherein:
the response range is one of a plurality of operation ranges divided according to a proportional value of a rated voltage on a power supply side or a voltage difference with the rated voltage; and
a load control solution corresponding to the response range comprising controlling the DC load whether to operate or adjusting an operating parameter of the DC load according to a voltage change parameter, wherein each operation range corresponds to one load control solution.

5. The method according to claim 4, wherein:
the plurality of operation ranges further comprises a protection range, an isolation range, and a normal operation range; and
a load control solution corresponding to the protection range comprises shutdown protection; a load control solution corresponding to the isolation range comprises controlling the load to operate normally and controlling the load to prepare for a response; a load control solution corresponding to the normal operation range comprises controlling the load to operate normally without responding.

6. The method according to claim 1, wherein the controlling the operation of the DC load according to the determination result and the type of the DC load comprises, in response to determining that the type of the DC load includes an adjustable power load:
adjusting a power of the adjustable power load according to the utilization voltage.

7. The method according to claim 1, wherein the controlling the operation of the DC load according to the determination result and the type of the DC load comprises, in response to determining that the type of the DC load includes an adjustable power load:
controlling an operating parameter of the adjustable power load to decrease or increase according to a preset corresponding relationship between a voltage and the operating parameter in response to the determination result indicating that the utilization voltage is in the response range; and
controlling the adjustable power load to operate normally without responding in response to the determination result indicating that the utilization voltage is not in the response range and not in the protection range.

8. The method according to claim 1, wherein the controlling the operation of the DC load according to the determination result and the type of the DC load comprises, in response to determining that the type of the DC load includes a transferable power load:
controlling the transferable power load to operate when a duration of voltage stabilization exceeds a predetermined time length.

9. The method according to claim 1, wherein the controlling the operation of the DC load according to the determination result and the type of the DC load comprises, in response to determining that the type of the DC load includes a transferable power load:
controlling the transferable power load to enter an operation waiting state and determining whether a waiting time is greater than a first set time, and if the waiting time is greater than the first set time, controlling the transferable load to enter an operation state, in response to the determination result indicating that the utilization voltage is in the response range; and
in response to the determination result indicating that the utilization voltage is not in the response range and not in the protection range:
controlling the transferable power load to operate normally, or
determining whether a duration in which the utilization voltage is in the normal operation range is greater than a second set time, if the duration is greater than the second set time, controlling the transferable power load to start the normal operation, and if the duration is not greater than the second set time, controlling the DC load to enter the operation waiting state.

10. The method according to claim 1, wherein the monitoring the utilization voltage of the DC load comprises:
monitoring the utilization voltage of the DC load by using a sampling circuit in the DC load.

11. A direct current (DC) load response control apparatus, comprising:
a memory; and
a processor coupled to the memory, the processor being configured to execute the method according to claim 1 based on instructions stored in the memory.

12. A non-transitory computer-readable storage medium with a computer program stored thereon, wherein the program, when executed by a processor, implements the DC load response control method according to claim 1.

13. A direct current (DC) electric appliance, comprising the DC load response control apparatus according to claim 11.

14. A direct current (DC) load response control apparatus, comprising:
a monitoring module, configured to monitor a utilization voltage of the DC load;
a determination module, configured to determine whether the utilization voltage is in a response range; and
a control module, configured to control an operation of the DC load according to a determination result and a type of the DC load, wherein the controlling the operation of the DC load according to the determination result and the type of the DC load comprises, in response to determining that the type of the DC load includes a fixed power load:

controlling the fixed power load to stop operating in response to the determination result indicating that the utilization voltage is in the response range and the utilization power being greater than a predetermined power, controlling the fixed power load to stop operating or operate intermittently according to a predetermined importance level of the fixed power load, or to operate normally, in response to the determination result indicating that the utilization voltage is in the response range and the utilization power being not greater than the predetermined power; and controlling the fixed power load to operate normally in response to the determination result indicating that the utilization voltage is not in the response range and not in the protection range.

15. A direct current (DC) electric appliance, comprising the DC load response control apparatus according to claim 14.

* * * * *